W. R. KLIER.
BELT GUIDE AND SHIFTER.
APPLICATION FILED MAR. 11, 1916.

1,211,716.

Patented Jan. 9, 1917.
3 SHEETS—SHEET 2.

Witnesses:

Inventor
W. R. Klier.
By
Attorney

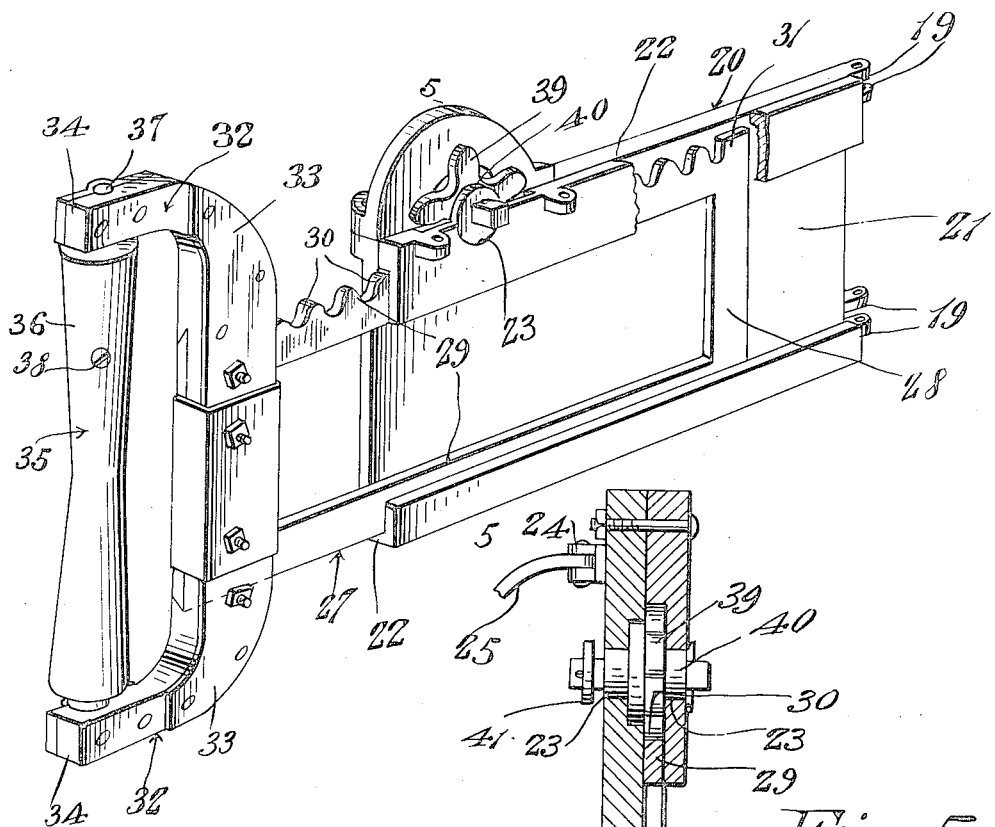

UNITED STATES PATENT OFFICE.

WILLIAM R. KLIER, OF NEWTON, ILLINOIS.

BELT GUIDE AND SHIFTER.

1,211,716.     Specification of Letters Patent.     Patented Jan. 9, 1917.

Application filed March 11, 1916. Serial No. 83,602.

*To all whom it may concern:*

Be it known that I, WILLIAM R. KLIER, a citizen of the United States, residing at Newton, in the county of Jasper and State of Illinois, have invented certain new and useful Improvements in Belt Guides and Shifters; and I do hereby declare the following to be a full, clear, and exact description of the invention, such as will enable others skilled in the art to which it appertains to make and use the same.

This invention relates to new and useful improvements in belt guides and shifters and the principal object of the invention is to provide a device which is readily attachable to traction engines of the ordinary character.

Another object of this invention is to provide a device by means of which the belt may be shifted without necessitating the operator leaving his position on the platform of the engine.

A further object of the invention is to provide a device for shifting the belt on to and off of the live pulley so that the operation of the various machines which are driven by the engine may be readily controlled.

With these and other objects in view, the invention consists in the novel combination and arrangement of parts which will be fully set forth in the following specification and accompanying drawings, in which:—

Figure 1:
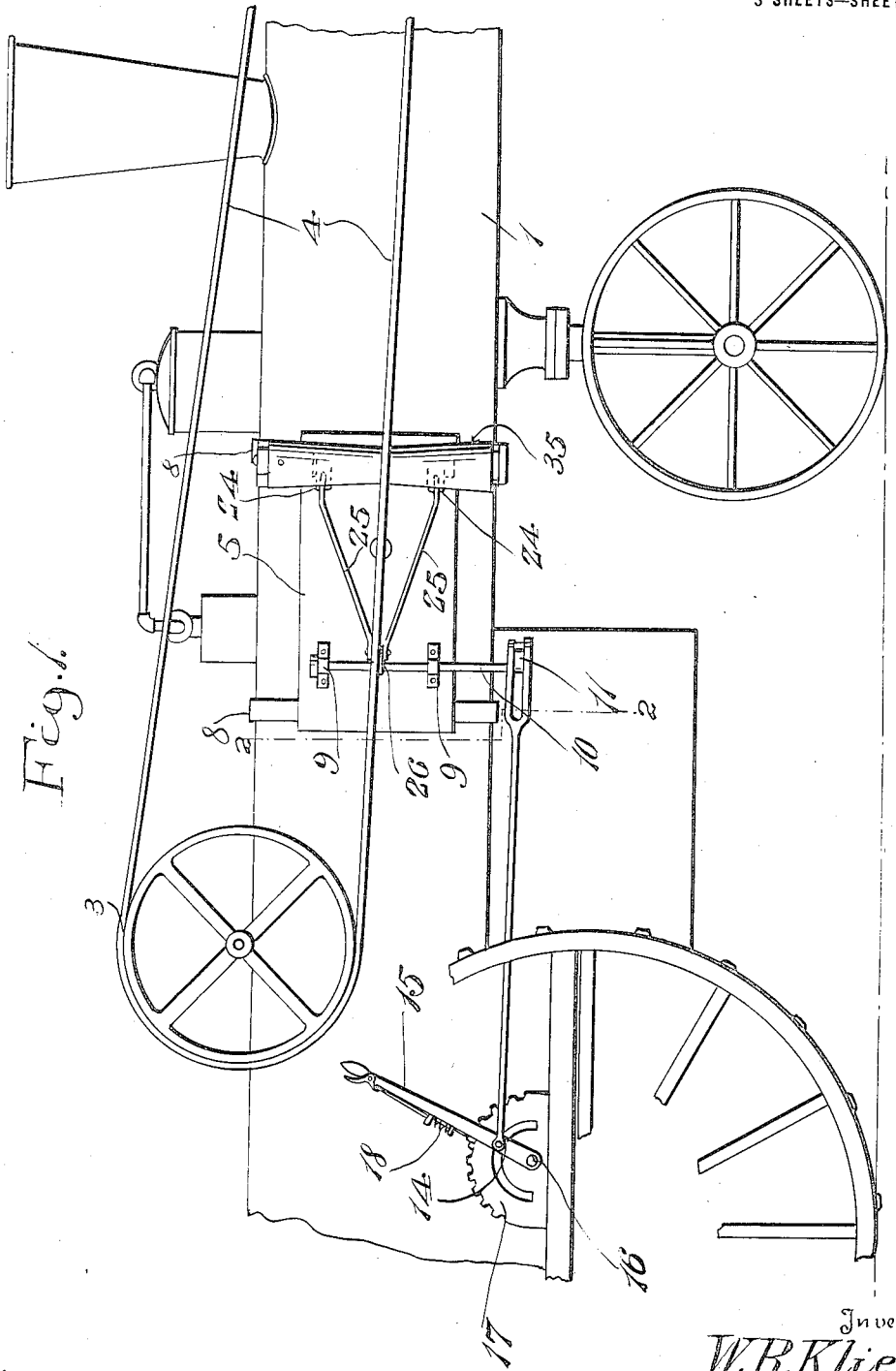
Figure 2:
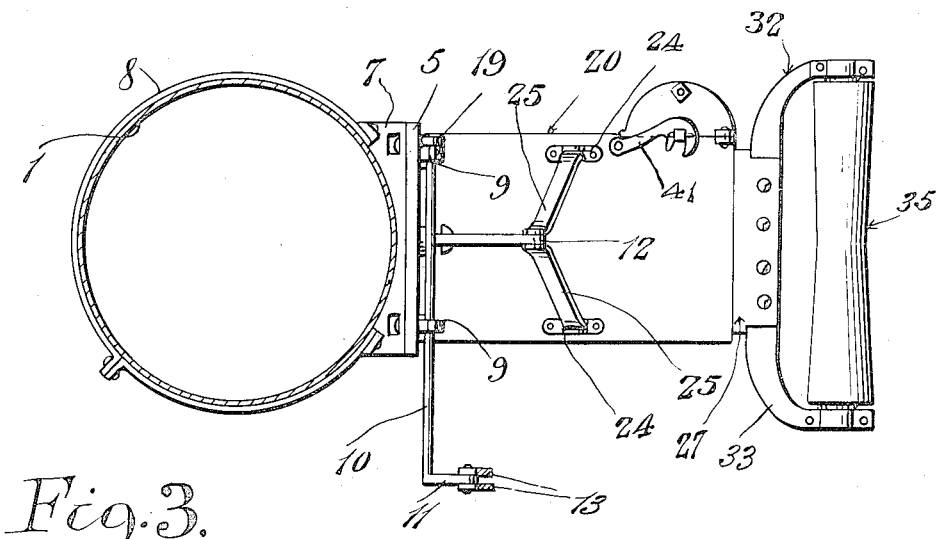
Figure 3:
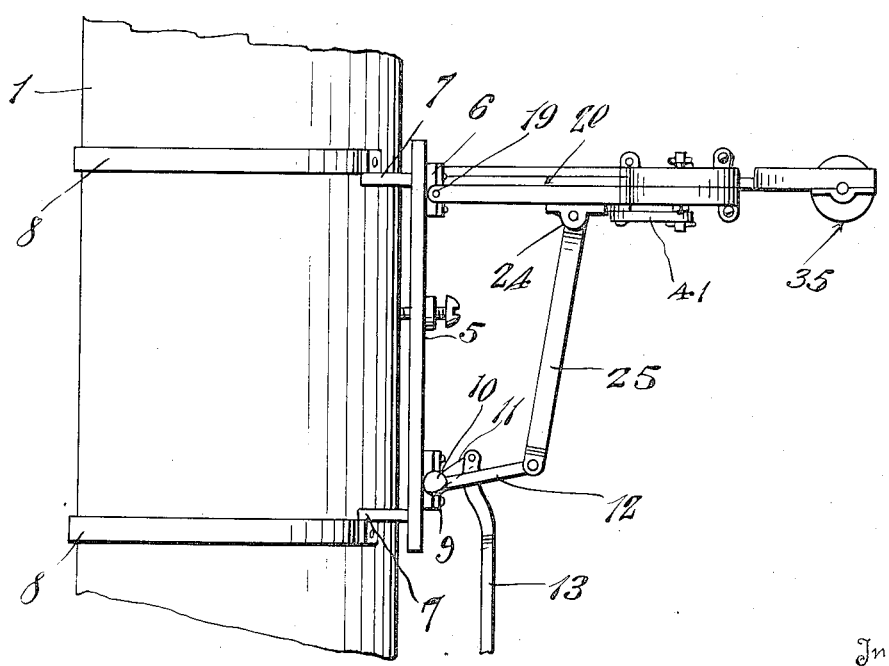

Figure 1 is a side elevation of a tractor showing this improved device attached thereto. Fig. 2 is a vertical sectional view on line 2—2 of Fig. 1. Fig. 3 is a top plan view of Fig. 1. Fig. 4 is a detail perspective view of the belt shifter showing the roller removed and also showing one section of the gear housing removed. Fig. 5 is a sectional view on line 5—5 of Fig. 4, and Fig. 6 is a horizontal sectional view through the belt shifting roller.

Referring to the drawings, the numeral 1 designates the boiler of an ordinary traction engine provided with the usual cylinder 2 and drive wheel 3. This wheel is provided with the usual belt 4 which is connected to and operates the mechanism being driven by the device. The belt shifter of the device comprises the attaching plate 5 provided near its forward end and near opposite sides with spaced ears 6. These ears extend outwardly from the face of the plate and are adapted to form pivotal connection for the base plate and sliding frame which will be more fully hereinafter described. This attaching plate 5 is secured on suitable brackets 7 in any preferred manner which brackets are held in place by the band 8 which surrounds the boiler 1 and are adapted to be clamped thereon for frictional engagement therewith to prevent the device from being disengaged. Secured to the plate 5 near its rear end are the alining straps 9 in which the shaft 10 is journaled and this shaft carries at its lower end the crank arm 11 and intermediate its end, the crank arm 12. These crank arms 11 and 12 extend in parallel relation and in substantially the same plane and secured to the outer end of the crank arm 11 is the link 13, the opposite end of which is pivoted at 14 to the lever 15, which is pivotally mounted at 16 to the frame of the engine. A suitable segment 17 is secured to the frame of the engine and the lever 15 carries a suitable latch mechanism 18 for engagement with the segment by means of which the lever is held in adjusted position.

Pivoted to the ears 6 hereinbefore referred to are the ears 19 formed on the base plate designated generally by the numeral 20 which comprises the web portion 21 having the flanges 22 formed at opposite edges. A suitable recess 23 extends into one of the edges and entirely through one of the flanges and is adapted for the accommodation of the adjusting gear wheel which will be more fully hereinafter described. Extending outwardly from the inner face of the web portion 21 are the ears 24 to which the links 25 are connected, which links are connected at their rear ends to the cross head 26 carried by the crank arm 12 on the shaft 10. It will thus be seen that upon movement of the lever 15, the base plate 20 will be swung on its pivot.

Slidably mounted between the flanges 22 on the base plate is the adjustable frame designated generally by the numeral 27 comprising a rear bar 28 having the parallel side bars 29 formed integral therewith. These bars 29 extend forwardly from the bar 28 and the uppermost side bar is provided with a plurality of rack teeth, the use of which will appear as the description proceeds. A suitable stop lug 31 is formed with the rear end of the rack bar 30 and is adapted to limit the outward movement of the frame 27. Secured to the free ends of the arms 29 are the roller supporting brackets 32 each of which comprises the arcuate shank 33 formed at its outer end with the head 34, in which the trunnion of the belt shifting roller, which will be more fully hereinafter described, is journaled.

The belt shifting roller above referred to is designated generally by the numeral 35 and comprises a pair of frusto-conical bodies 36 having their reduced ends joined. Suitable trunnions 37 are formed at the bases thereof and extend through openings formed in the heads 34 in which the trunnions are journaled. A suitable set screw 38 extends through one of the frusto-conical sections 36 and is adapted to hold the device firmly in place.

In order to adjust the frame 27 with relation to the base plate 20 there is provided a pinion 39 which is mounted on a shaft 40 journaled in the base plate 20 and this pinion seats in the recess 23 and is adapted to engage the teeth 30 of the frame 27. A suitable retaining hook 41 is provided, in order to retain the pinion 39 in proper position, which is secured to the uppermost flange 22 in any suitable manner as clearly shown in Fig. 4.

It will be apparent from the foregoing that in use when it is desired to throw the belt off of the drive wheel 3, the lever 15 is moved forwardly, thereby causing the shaft 10 to rotate so that the crank arm 12 is thrown outwardly thus exerting pull on the link 25 and causing the plate 20 to swing on its pivot and move the free end thereof outwardly and away from the engine. It will thus be seen that the roller 35 will be caused to engage the belt and move the same outwardly. When it is desired that the belt return to its original position, the lever 15 is thrown rearwardly and it will be evident that the plate 20 will be swung inwardly on its pivot, thereby disengaging the roller from the belt and allowing the same to shift over on to the live pulley. In order that various degrees of adjustment may be had between the shifting roller 35 and the pivot of the plate 20, the pinion 39 is provided which engages the rack teeth 30 and it will be seen that upon rotating the pinion the arms may be adjusted between the flanges of the plate and it will also be evident that the outward movement of the frame 27 will be limited due to the engagement of the stop 31 with the pinion. A suitable stop is provided for limiting the inward swinging movement of the plate 20 as clearly illustrated in Fig. 3.

While in the foregoing there has been shown and described the preferred embodiment of this invention, it is to be understood that such changes may be made in the combination and arrangement of parts as will fall within the spirit and scope of the appended claims.

What is claimed is:—

1. In a belt shifter, a swinging plate, a frame adjustably mounted on said plate, a gear to adjust said frame, rollers carried by the forward end of the frame and adapted to engage a belt to shift the same and means to swing the plate on its hinges.

2. In a belt shifter, an attaching plate, a base plate hinged to the attaching plate, guide flanges on the base plate, means to swing the base plate on its hinges, a longitudinally adjustable frame slidably mounted on the base plate, rollers carried by the frame, and means to adjust the frame on said plates.

3. In a belt shifter, a base plate, means to attach the base plate to the boiler of a traction engine, a hinged plate hingedly connected to the forward end of the base plate, guide flanges on the hinged plate, a shaft on the base plate, a lever controlling the movement of the shaft, links connected to the lever, and to the hinged plate, a frame adjustably mounted on the hinged plate between the guide flanges, a pinion for adjusting said frame with relation to the hinged plate, a stop to limit the outward movement of the frame, and a roller at the forward end of the frame adapted to engage a belt to shift the same upon the swinging of the hinged plate.

4. In combination with a hinged plate, a frame, adjustable on said plate, brackets at the forward end of the frame, a shaft journaled in the forward ends of the brackets and a roller comprising a pair of frusto conical elements having their reduced ends joined, mounted on said shaft.

In testimony whereof I affix my signature in presence of two witnesses.

WILLIAM R. KLIER.

Witnesses:
  W. A. RAEF,
  H. P. RAEF.